June 1, 1926.  
J. W. GRISWOLD  
METHOD OF AND APPARATUS FOR CONTROLLING THE COMBUSTION OF FUEL IN FURNACES  
Filed Feb. 12, 1920  2 Sheets-Sheet 1

Inventor  
John W. Griswold  
By His Attorney  
Edmund G. Borden

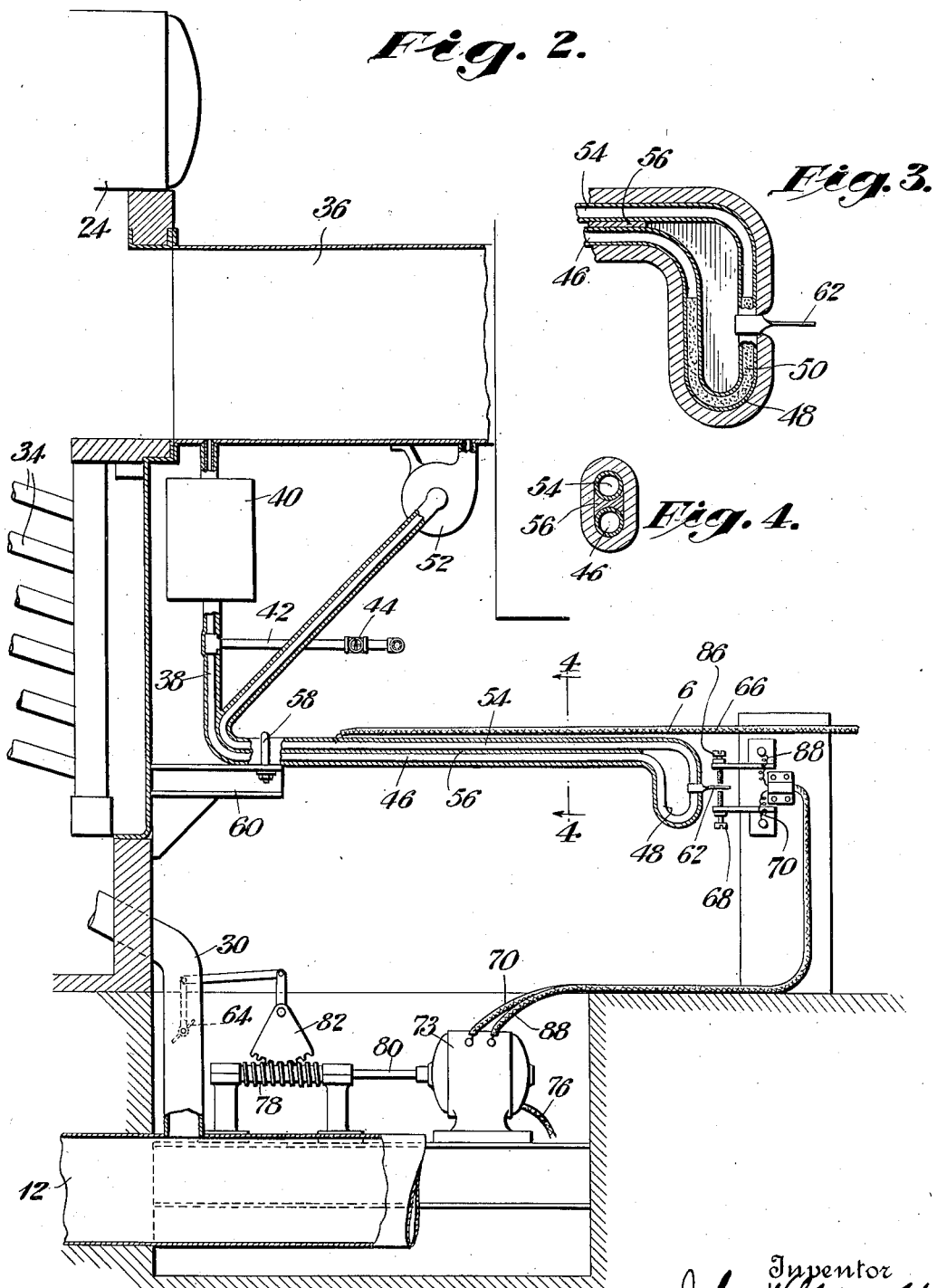

Patented June 1, 1926.

1,587,119

UNITED STATES PATENT OFFICE.

JOHN WILLIAM GRISWOLD, OF WARREN, PENNSYLVANIA, ASSIGNOR TO HENRY L. DOHERTY & COMPANY, A COPARTNERSHIP (COMPOSED OF HENRY L. DOHERTY AND FRANK W. FRUEAUFF), OF NEW YORK, N. Y.

METHOD OF AND APPARATUS FOR CONTROLLING THE COMBUSTION OF FUEL IN FURNACES.

Application filed February 12, 1920. Serial No. 358,016.

This invention relates to a method of and an apparatus for controlling the combustion of fuel in a furnace, and more particularly to a method and apparatus for controlling the combustion of fuel in accordance with the composition of the flue gases leaving the furnace.

To obtain perfect combustion of fuel, it is essential that sufficient air or other source of oxygen be supplied to a furnace to provide the oxygen necessary for burning all of the fuel. It is desirable that the construction of the furnace should be such that oxygen or air in excess should be introduced into the furnace so that all of the products of combustion may be burned within the furnace in contact with heat transferring surface, and no combustible material should be carried out of the furnace with the exhaust combustion products. Although the use of a large excess of air for combustion in a furnace might insure a complete combustion of the fuel, such an excess is not desirable because it tends to cool the flame temperature and the combustion zones and acts to carry a large quantity of unabsorbed heat out of the furnace with the exhaust products. The ideal conditions for combustion, accordingly, may be obtained when the minimum of air necessary to effect complete combustion of the fuel is supplied to the furnace and when the flue gases contain a small percentage of free oxygen in excess of that necessary for complete combustion.

Many furnace tests have been made which appear to indicate that higher combustion efficiencies have been obtained when burning some types of fuels with a comparatively high percent of over-ventilation than with a low percent of over-ventilation. I have discovered, however, that the highest combustion efficiencies can be obtained when the over-ventilation is held as low as practicable. In a case where a furnace shows higher combustion efficiencies with a higher percentage of over-ventilation the furnace combustion chamber is not properly designed or the air for burning combustion gas is not properly mixed with gas formed in the combustion chamber or the efficiencies may be effected by both the combustion chamber design and faulty air mixture.

The $CO_2$ analysis of the flue gas has been adopted as the basis for controlling combustion in steam boiler furnaces on the assumption that there is a definite relation between the $CO_2$ of the flue gas and the excess air supplied to the furnace. It is well accepted, however, that the fixed relation between the $CO_2$ and the $O_2$ in the flue gases will vary with each coal and will only be maintained with fuels that are all or mainly fixed carbon. With coals which have a high percentage of volatiles that form hydrogen and hydrocarbon in the combustion gas the fixed relation between the $O_2$ and the $CO_2$ does not hold. I have found that high volatile coals which form high percentage of gas give off combustion gases when burned which vary in composition quite widely from one period to another. I have also found that the composition of the combustion gas varies; with the temperature of the fuel bed; with the addition of steam to air passing through the fuel bed; with the ratio of air to steam passing through the fuel bed; with the type of firing that is hand or stoker firing, and for other causes depending on local conditions. For example, a high bituminous coal when first placed in a furnace will give off gases having a high percentage of hydrocarbon and hydrogen. The ultimate $CO_2$ for these gases for complete combustion is approximately 14%. As the coal continues to burn it forms coke and the ultimate $CO_2$ of the fuel gas in the coke is about 21%. The addition of steam to a bed of coke will form a varying percent of hydrogen and hydrocarbons in accordance with the furnace temperature and the volume of steam used. Further, if the air for combustion is suddenly cut off from a hot bed of partially burned coal the composition of the combustion gases will vary. When burning a fuel of approximately constant composition under such varying conditions the $O_2$ analysis of the flue gas will provide an accurate control of the combustion, whereas, the $CO_2$ analysis control under such conditions is very inaccurate.

When the proper amount of air is supplied to burn all of the combustion gases leaving the fuel bed, it does not matter whether the constituents of the gas are carbonmonoxide, hydrogen, hydrocarbons, sulphur or a mixture of any or all of these, because the presence of a small amount of $O_2$ in the flue gas is an accurate indicator that practically all the combustible material of the fuel has been burned. With a properly designed combustion chamber the $O_2$ flue gas analysis control may maintain a constant minimum percentage of over-ventilation to obtain the maximum combustion efficiency, regardless of the variation of the composition of the gases undergoing combustion. If the sulphur, hydrogen and hydrocarbon contents of the combustion gas varies, the $CO_2$ content of the flue gas will have no definite relation to the oxygen content of the flue gases.

Some industrial plants such as artificial gas plants and oil refineries have different kinds of fuels available for heating purposes, many of which are by-products. Such fuels are bituminous coals, artificial gas of different kinds, oil distillation gases of different kinds, natural gases, fuel oils and coke formed from coal and oil distillation. If any one of these fuels or a mixture of any or all of them can be burned in a furnace at the same time, they form an important source of fuel economy. When burning any or a mixture of these fuels the presence of free oxygen in the flue gas indicates that the combustible of the fuel, regardless of its composition, has been burned and a regulation of the combustion depending upon the $O_2$ analysis of the flue gas will control the combustion regardless of the varying composition of the fuels being burned. Further, in the combustion of fuels of variable compositions, particularly the fuel which contains a high hydrogen or a high hydrocarbon content, or both, there is no definite relation between the $CO_2$ content and the free oxygen content of the flue gases.

The $O_2$ flue gas analysis control is an accurate indicator of the over ventilation of a furnace. When burning fuels that are not all or mainly fixed carbon the $O_2$ analysis control may be used for controlling the flame temperature, whereas, a $CO_2$ analysis control would be useless. Furnaces such as those used in metallurgy and for annealing may use fuels having a hydrogen or hydrocarbon content whose available flame temperature is only a few hundred degrees above that required for treating the material being worked upon. In such a case an over-ventilation from 5 to 10 per cent will so dilute and cool the furnace gases that the desired temperature for treating the work can not be obtained. $O_2$ analysis control may be effectively used to hold the over-ventilation to any desired minimum.

The primary object of the present invention is to provide a method of regulating the combustion of fuel in a furnace, in which the regulation is independent of the composition of the fuel.

Another object of the invention is to provide a method of regulating combustion of fuel in a furnace in which the regulation is independent of the varying conditions or manner in which the fuel may be burned.

Another object of the invention is to provide a combustion regulator for furnaces, in which the regulation is independent of the composition of the fuel.

A further object of the invention is to provide a method of regulating the combustion of fuel in a boiler furnace, in which the rate of combustion of the fuel is controlled by the boiler pressure, and the character of combustion is controlled by the amount of free oxygen in the products of combustion in the furnace.

A further object of the invention is to provide a combustion regulator for furnaces, which continuously tests the composition of a very small representative sample of the flue gases and by means of said tests continuously and instantaneously regulates the supply of air to said furnace.

A further object of the invention is to provide a combustion regulator for furnaces, which tests the composition of the flue gases and regulates the combustion of fuel in the furnace to maintain a minimum percentage of free oxygen in the flue gases.

With these and other objects in view, the invention consists in the process and apparatus described in the following specification and defined in the claims.

The various features of the invention are illustrated in the accompanying drawings, in which:

Fig. 2 is a detail sectional view of the combustion regulator;

Fig. 3 is a detail sectional view showing a part of the apparatus for testing flue gases; and Fig. 4 is a detail sectional view on line 4—4 of Fig. 2.

Figure 1:
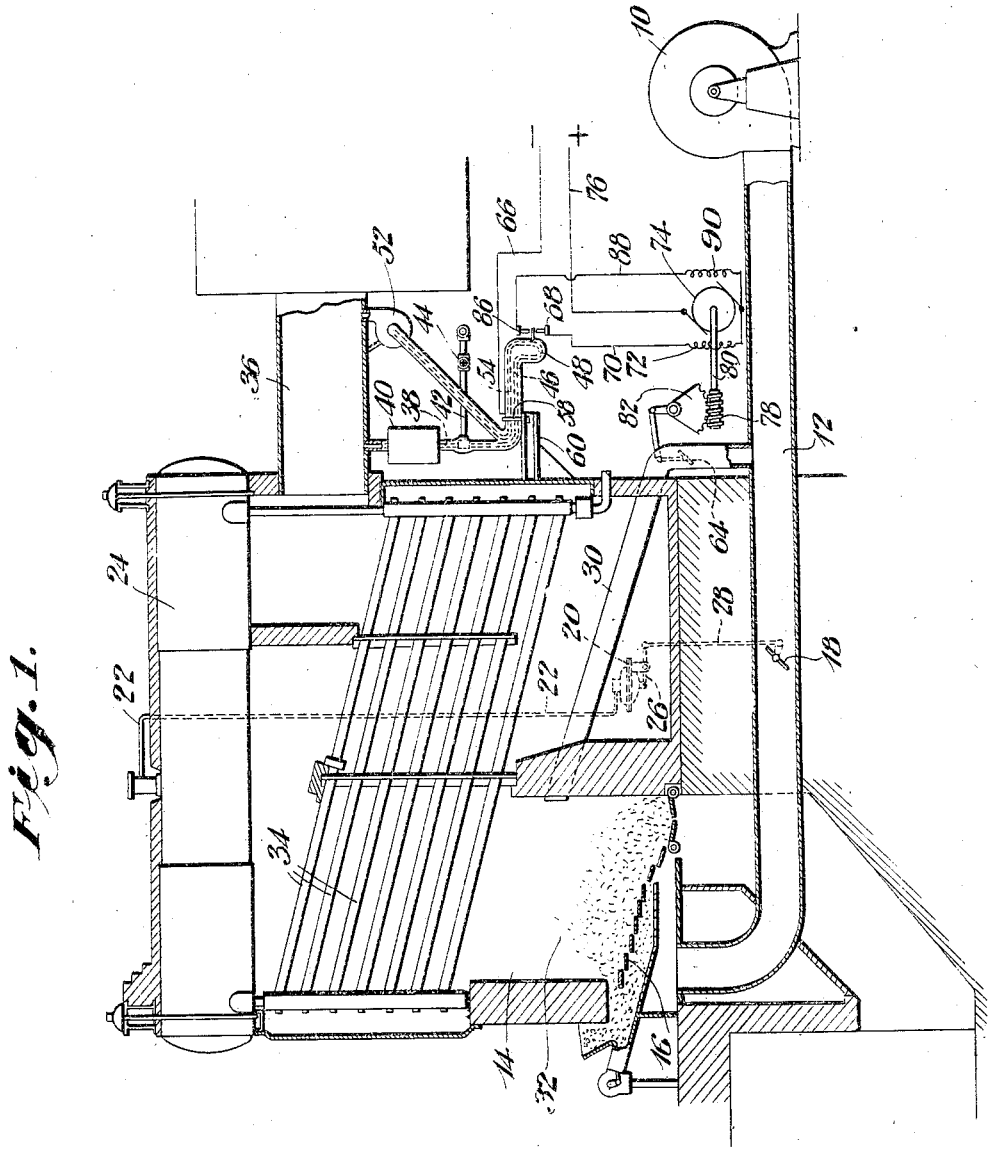
Fig. 1 is a vertical sectional view of a furnace and combustion regulator embodying a preferred form of the invention, parts of the apparatus being shown diagrammatically to more clearly bring out their function.

In the present invention the rate of combustion is controlled by the steam pressure in the boiler and the completeness of combustion is controlled by the quantity of free or unconsumed oxygen in the products of combustion leaving the furnace. To this end, a primary draft of air is admitted beneath and forced upwardly through the fuel bed and the rate of combustion is regulated by increasing or decreasing this draft. To insure the complete utilization of this primary supply of air, a comparatively thick bed of fuel is used which acts similarly to a gas producer and forms carbon monoxide in the upwardly passing gases. The primary air draft as it leaves the fuel bed, therefore, carries with it a considerable amount of unburned combustible gases. To complete the combustion of the unburned gases, a secondary supply of air slightly in excess of that sufficient to insure complete combustion is introduced into the combustion chamber above the fuel bed.

The quantity of secondary air supplied to the furnace is controlled directly by the quantity of free oxygen in the products of combustion passing from the furnace. To this end a small portion of the products of combustion are continuously withdrawn from the furnace flue and mixed with an excess of a combustible gas. The mixture of flue gas and combustible gas is then passed through a mass of palladium black or other catalytic agent capable of causing any free oxygen in the gas mixture to unite with the combustible gas. The amount of combustible gas burned will vary directly with the quantity of oxygen present in the gases and the temperature rise due to the combustion will be a quantitative measure of the oxygen content of the gas. The rise in temperature of the gases due to the combustion of the gas with oxygen actuates a thermally controlled damper to cut down the supply of secondary air when the percentage of oxygen rises to a certain limit, and to increase the secondary air supplied when the oxygen content falls to approximately zero percent.

If the liquid or gaseous fuel is used the supply of fuel, and accordingly the rate of combustion, may be regulated by the steam pressure of the boiler and the entire quantity of air supplied to the furnace, and accordingly the character of combustion, may be controlled by the oxygen content of the flue gases.

A combustion regulator applied to an ordinary coal fired steam boiler is shown in Fig. 1. In this arrangement air for supporting combustion is forced by means of a fan 10 through an air supply pipe 12 and enters a furnace 14 under a fuel grate 16. The quantity of air passing through the pipe 12 to the space under the fuel grate 16 controls the rate of combustion and is governed by a damper 18 the position of which is controlled by the steam pressure of the boiler.

To this end the furnace is provided with a pressure diaphragm 20 which communicates through a connecting conduit 22 with the steam drum 24 of the boiler. The movement of the diaphragm 20, due to variations in the steam pressure of the boiler, is transmitted through a lever 26 and a connecting rod 28 to the damper 18. As the pressure in the steam drum 24 of the boiler increases, the diaphragm 20 is depressed and transmits its movement through the lever 26 and connecting rod 28 to move the damper 18 toward closed position. Conversely, when the steam pressure in the drum 24 falls, the diaphragm 20 rises and the damper 18 moves toward open position.

The combustion of the unburned combustible gases leaving the fuel bed is completed by means of a secondary air supply introduced by a branch pipe 30 leading from the pipe 12 to a combustion chamber 32 above the grate 16. From the combustion chamber 32 the products of combustion pass back and forth in contact with a bank of water tubes 34 and leave the furnace through a flue 36.

In determining the amount of free oxygen in the products of combustion, a small portion of the flue gases from the flue 36 are mixed with a small amount of a combustible gas and drawn through a tube which is bent to form two straight parallel sections. A catalytic material capable of catalyzing the combustion of the flue gases with any free oxygen present in the mixture is placed in the bent portion of the tube and the ends of the straight sections of tube opposite the bend are fastened to each other. The two sections of tube are separated by heat insulating material and acquire substantially the same temperature as the gases passing through them. The temperature of the gases is raised in passing through the catalytic material by the combustion of the combustible gas with any free oxygen contained in the flue gases so that the two sections of tube are brought to temperatures whose difference is proportional to the amount of free oxygen. Under the influence of this difference in temperature, the parallel sections of the tube expand unequally and bend proportionally to the difference in temperature and to the quantity of free oxygen in the products of combustion in much the same manner as a metallic expansion thermometer operates. The displacement of the bent portion of the tube thus indicates the presence of an excess of free oxygen in the flue gases, and is used to control the draft of air to the furnace.

In testing the products of combustion for free oxygen or unconsumed gases, a small quantity of flue gas is continuously drawn from the flue 36 through a small heat insulated tube 38 (Fig. 2). To remove any substances which might poison the catalyst thru which the gases are to be passed, the flue gases are passed through a filtering and purifying box 40 in which any substances which would injure the catalyst are removed. The purified flue gases from the purifier 40 are then mixed with a fuel gas introduced into the tube 38 through a pipe 42. Any type of combustible gas may be supplied through the pipe 42, but a comparatively simple gas such as hydrogen or carbon monoxide is preferred. The volume of the combustible gas is very small compared with the volume of the flue gases and is usually slightly more than sufficient to combine with any amount of oxygen which would ordinarily be contained in the flue gases to be tested. The quantity of hydrogen admitted through the pipe 42 may be regulated by means of a valve 44 in the pipe 42. The mixture of flue gases and combustible gas passes through a straight section 46 of the tube 38 and enters a catalytic chamber 48 (Fig. 3) formed by bending the tube 38 in the form of a U. The catalytic chamber 48 is filled with a porous mass of palladium black 50 or other catalytic material capable of catalyzing the combustion of the combustible gas with any oxygen contained in the flue gas. The gases passing through the tubes are at a sufficiently high temperature to react very rapidly on reaching the catalytic material and are heated still higher by the combustion of the gases. After passing through the mass of catalytic material 50, the gases are drawn by a fan 52 through a straight section of tube 54, parallel to the section 46 of the tube 38 and are then returned to the flue 36. The section 54 of the tube is separated from the tube section 46 by a layer of insulating material 56 (Fig. 4) which prevents the transference of heat from one section of tube to the other. The ends of the tube sections 46 and 54 opposite the catalytic chamber 48 are fastened together by a bolt or clamp 58 and are rigidly supported on a bracket 60. The tube sections are made of thin sheet metal so that they quickly acquire the temperatures of the gases passing through them. Consequently, the tubes 46 and 54 are raised to unequal temperatures due to the rise in temperature of the gas passing through the catalytic chamber 48 and expand unequally due to the unequal heating. Since the ends of the tubes are fastened at 58, this unequal expansion causes the tubes to bend and to displace the catalytic chamber by an amount corresponding to the free oxygen content of the flue gases. The amount of this displacement is measured by a contact pointer 62 mounted on the catalytic chamber 48.

To control the supply of secondary air to the furnace, a damper 64 mounted in the branch pipe 30, is moved in opposite directions by a motor whose direction of rotation is governed by the position of the contact pointer 62. As the quantity of free oxygen in the flue products increases, the motor is driven in a direction to decrease the secondary air supply to the pipe 30, and as the quantity of free oxygen diminishes, the motor is driven in the opposite direction to increase the secondary air supply through the pipe 30. To this end, the contact pointer 62 is connected through the tube section 54 with an electric main 66. As the quantity of free oxygen in the flue gases increases, the unequal heating and expansion of the tubes 46 and 54 displaces the contact pointer 62 downwardly and brings it into contact with an adjustable contact 68. Through this contact an electric current will flow from the main 66 to a branch electric circuit 70 to which the contact 68 is connected. From the branch electric circuit 70, the current flows through a field winding 72 (Fig. 1) of a double wound series motor 73 and through the armature 74 of the motor to an electric main 76. As the armature of the motor is driven through the influence of this electric current, it rotates a worm 78 on a shaft 80 rotated by the armature. The worm 78 meshes with a gear segment 82 which is in turn rigidly connected to the damper 64 in the branch pipe 30. The rotation of the motor armature 74 therefore acts through the worm gear 78 and 82 to close the damper 64.

The passage of gases from the combustion chamber 32 to the flue 36 and through the tubes 46 and 54, is very rapid, occupying but a few seconds. Any change in the condition of the fuel bed or in the character of combustion affecting the composition of the flue gases, acts on the testing apparatus within a few seconds, and the action of the apparatus is, for all practical purposes, substantially instantaneous. Consequently, as the amount of free oxygen present in the flue gases comes within the predetermined maximum limit, the tubes 46 and 54 straighten, carrying the contact pointer 62 out of contact with the adjustable contacts 68 and stopping the rotation of the motor armature 74.

If the quantity of free oxygen decreases below the minimum limit, the tube sections 46 and 54 of the gas testing apparatus are brought to approximately the same temperature and the contact pointer 62 is displaced upwardly until it contacts with an adjustable contact 86, through which an electric current flows from the main 66 to a branch electric circuit 88 connected to the contact 86. From the branch circuit 88 the current flows through a field winding 90 of the motor 73 and through the armature of the motor to the main 76. The passage of the current through the field winding 90 reverses the field of the motor and the armature of the motor is driven in the opposite direction to slowly open the damper 64 through the worm gears 78 and 82. In this manner, as soon as the contact pointer 62 is moved in one direction or another by the rise or fall of the oxygen content in the products of combustion through the fixed maximum or minimum limits, the motor armature 74 is rotated to close or open the damper 64. By this means the supply of air is continuously under the control of the composition of the flue gases.

The limits of percentage of oxygen at which the draft is increased or decreased may be varied by varying the position of the adjustable contacts 68 and 86. When the contact pointer 62 has contacted with one of the contacts 68 or 86, any further movement of the pointer has no influence upon the operation of the device, but simply tends to bend or spring the pointer. Since the determination of the oxygen above or below the limits set need not be quantitative, the amount of combustible gases introduced through the pipe 42 need to be only sufficient to burn an amount of free oxygen slightly greater than the upper limit at which the contact 68 is set, thus permitting the oxygen above this percentage to pass through the apparatus unconsumed.

A shunt wound motor or other reversing mechanism may be used in place of the series wound motor, and other details of construction may be changed without departing from the broad features of the invention.

While the invention has been described as applied to a steam boiler in connection with a device by which the rate of combustion is independently regulated, the apparatus described above may be used in other cases without an independent device for regulating the rate of combustion. For example, in brass melting and similar metallurgical furnaces the rate of combustion may be regulated by hand and the character of combustion controlled to give a maximum temperature. For this purpose, the supply of air must be so regulated that there will be very little if any excess of air supplied and accordingly little or no free oxygen in the products of combustion, since the addition of air above that necessary for complete combustion reduces the temperature obtained because of the cooling action of the excess air. In this case, therefore, the above described combustion control device is used, without the automatic device for controlling the rate of combustion, to control the total amount of air supplied to the furnace in such a manner that the amount of free oxygen in the combustion products is reduced to the minimum amount necessary to insure complete combustion of the fuel.

Having described the invention, what is claimed as new is:

1. A method of controlling the combustion of fuel in a boiler furnace, which comprises supplying air for combustion, controlling the rate of combustion of the fuel by means of the air supply in accordance with the boiler steam pressure and controlling the completeness of combustion by the air supply in accordance with the quantity of free or unconsumed oxygen contained in the products of combustion.

2. A method of controlling the combustion of fuel in a boiler steam furnace which comprises controlling the rate of combustion by the boiler pressure, supplying air for effecting complete combustion of said fuel and controlling the completeness of combustion by the quantity of free or unconsumed oxygen contained in the products of combustion.

3. A method of controlling the combustion of fuel in a boiler furnace, which comprises passing a primary supply of air through a body of fuel, controlling the supply of said primary air by the steam pressure of said boiler, continuously withdrawing a portion of the products of combustion from said furnace, adding a small amount of combustible gases to said portion of products of combustion, passing said mixture of gases through a combustion catalyst and controlling the supply of secondary air to said furnace by the temperature change in gases passing through said catalyst.

4. A method of controlling the combustion of fuel in a boiler furnace, which comprises passing a primary supply of air through a body of fuel, controlling the supply of primary air by the steam pressure of said boiler, continuously withdrawing a portion of the products of combustion from said furnace and rapidly testing said portion of combustion products for free oxygen and controlling the supply of secondary air to said furnace by the quantity of free oxygen in said portion of combustion products.

5. A method of controlling the combustion of fuel in a boiler furnace, which comprises passing air through a body of fuel in said furnace, automatically controlling the supply of said air by the steam pressure of said boiler, supplying an additional amount of air to said furnace to complete the combustion of unburned or incompletely burned gases leaving said fuel body, and controlling the supply of additional air by mechanism responsive to the quantity of unconsumed oxygen in the products of combustion from said furnace.

6. A method of controlling the combustion of fuel in a boiler furnace which comprises passing air through a body of fuel in said furnace, controlling the supply of said air by mechanism responsive to the steam pressure of said boiler, supplying an additional amount of air to said furnace above said fuel bed to complete the combustion of unburned or incompletely burned gases leaving said fuel bed and controlling the supply of additional air by mechanism responsive to the quantity of unconsumed oxygen in the products of combustion from said furnace.

7. In a method of controlling the combustion of fuel in a furnace, the steps of mixing a portion of the products of combustion of said fuel with a combustible gas, burning said mixture by means of a catalyst, measuring the rise in temperature of said mixture, and controlling the supply of air for control of the completeness of combustion of said fuel in accordance with said rise in temperature.

8. A combustion regulator for furnaces which comprises means for determining the oxygen content in the combustion products from said furnace, and means automatically controlled by said oxygen content determining means for regulating the supply of gases entering into combustion in said furnace.

9. An apparatus for regulating the combustion of fuel in a furnace, which comprises means for withdrawing a sample of combustion products from said furnace, means for determining the oxygen content of said sample, and means governed by said oxygen-determining means for regulating the supply of combustion gases to said furnace.

10. An apparatus for regulating the combustion of fuel in a furnace, which comprises means for withdrawing a portion of the products of combustion from said furnace, means for introducing a gas into said sample, means for passing said sample and gas through a combustion catalyst, and means governed by the temperature rise of said gases in passing through said catalyst for regulating the supply of combustion gases to said furnace.

11. An apparatus for regulating the combustion of fuel in a furnace, which comprises means for withdrawing a portion of the products of combustion from said furnace, means for introducing a combustible gas into said portion, means for passing said mixed gases through a combustion catalyst, a motor-driven damper for regulating the supply of gases to said furnace, and means governed by the temperature rise in said gases for governing said motor.

12. A combustion regulator for furnaces which comprises means for mixing in definite portions, a portion of the products of combustion from said furnace with a gas, means for insuring the combustion of any combustibles and free oxygen in said mixture, means for measuring the rise in temperature due to said combustion, and means governed by said rise in temperature for controlling the supply of air to said furnace.

13. A method of controlling the combustion of fuel in a furnace, which comprises continuously withdrawing a portion of the products of combustion of said fuel, determining the quantity of free oxygen in them, and increasing or decreasing the supply of combustion gases to said furnace as the percentage of oxygen in the combustion products falls below or rises above a fixed percentage.

14. A method of controlling the combustion of fuel in a furnace, which comprises withdrawing a portion of the products of combustion from said furnace, burning the free oxygen of said portions of combustion products with a combustible gas, measuring the rise in temperature due to the combustion of oxygen in said portion of combustion products, and increasing or decreasing the supply of combustion gases to said furnace as the temperature obtained in the combustion of said portions rises or falls.

15. A combustion regulator for furnaces which comprises two lengths of tube held firmly at one end, a catalyst chamber connecting the other ends of said tubes, a combustion catalyst in said chamber, means for drawing a portion of the products of combustion from said furnace successively through one of said tubes, the catalyst chamber and the other of said tubes, means for injecting a gas into the products of combustion entering said first tube, and means controlled by the unequal expansion of said tubes for regulating the supply of combustion gases to said furnace.

16. A combustion regulator for furnaces comprising a catalyst chamber, tubes connected to said catalyst chamber and arranged to bend and to move said catalyst chamber when expanding unequally, means for injecting gas into the end of one of said tubes farthest from said catalyst chamber, means for drawing products of combustion with said injected gases successively through one tube, through said catalyst chamber and through said second tube, a damper controlling the supply of combustion gases to said furnace, a motor arranged to rotate said damper, branch electric circuits arranged to drive said motor in opposite directions and a contact on said catalyst chamber arranged to connect alternate branch electric circuits to an electric supply means as said catalyst chamber is moved in opposite directions by the unequal expansion of said tubes.

17. A combustion regulator for furnaces comprising means for withdrawing a portion of the products of combustion from said furnace, means for supplying gas to said portion of products of combustion, means for causing said gas to re-act exothermally with one constituent of the said products of combustion, means governed by the rise in temperature of said re-acting gases for connecting one or the other of alternate branch circuits to an electric main and means governed by the passage of electric current in said branch circuits for varying the supply of combustion gases to said furnace.

18. A combustion regulator for furnaces comprising means for supplying air to said furnace, a damper in said air supply means, a motor, a speed reducing worm connecting said motor to said damper, branch electric circuits connected to drive said motor in opposite directions and means governed by the oxygen content of the flue gases from said furnace for connecting one or the other of said branch circuits to an electric main as the oxygen content in said flue gases rises above or falls below a limiting percentage.

19. A combustion regulator for furnaces, comprising in combination means for determining the free or uncombined oxygen content in the products of combustion from said furnace, means for increasing the proportion of oxygen to fuel supplied to said furnace as the oxygen content in said products of combustion decreases below a certain limit, and for decreasing the proportion of air to fuel supplied to said furnace when the percentage of oxygen in the products of combustion from said furnace increases beyond a certain percentage, and means for adjusting said limits of oxygen content in said combustion products at which said air control means is operated.

20. In a method of controlling the combustion of fuel in a furnace the steps of passing combustion products from said furnace through a combustion catalyst to cause the ignition and combustion of combustible gases in said combustion products and utilizing the rise in temperature due to said combustion for regulating a supply of combustion supporting gases to the furnace.

21. In a method of controlling the combustion of fuel in a furnace by the composition of the products of combustion from said furnace, the steps of passing a portion of said products of combustion in thermal contact with a thermo expansion element, passing said products of combustion through a combustion catalyst, passing said gases heated by the combustion of combustible materials in said catalyst in thermal contact with a second thermal expansion element and measuring the difference in expansion of said elements due to said heating.

22. In an apparatus for regulating the combustion of fuel in a furnace, the combination of two tubes heat insulated from each other and connected at one end, a catalyst chamber, containing a combustion catalyst, connecting the other ends of said tubes, means for drawing a combustible mixture of gases successively through one tube, through said catalyst and through the other of said tubes, and means controlled by the temperature of said tubes for controlling air passing to the furnace.

23. Apparatus for controlling the combustion of fuel in a boiler furnace which comprises means for passing a primary supply of air through a body of fuel, means operated by the steam pressure of said boiler for controlling the supply of said primary air, means for continuously withdrawing a portion of the products of combustion from said furnace, and adding a small amount of combustible gases to said portion, a combustion catalyst, means for passing said mixture of gases through said combustion catalyst, and means for controlling the supply of secondary air to said furnace by the temperature change in the gases passing through said catalyst.

24. An apparatus for controlling the combustion of fuel in a boiler furnace which comprises means for passing a primary supply of air through a body of fuel, means operated by the steam pressure of said boiler for controlling the supply of primary air to said furnace, means for continuously withdrawing a portion of the products of combustion from said furnace and rapidly testing said portion of combustion products for free oxygen, means for introducing a secondary air supply above the fuel body, and means for controlling the supply of secondary air to said furnace in response to the quantity of free oxygen in said portion of combustion products.

25. An apparatus for controlling the combustion of fuel in a boiler furnace, which comprises means for passing air through a body of fuel in said furnace, means operated by the steam pressure of said boiler for controlling the supply of said air, means for supplying an additional amount of air to said furnace to complete the combustion of unburned or incompletely burned gases leaving said fuel bed and means controlled by the quantity of unconsumed oxygen in the products of combustion from said furnace for controlling the supply of said additional air.

26. In an apparatus for controlling the combustion of fuel in a furnace by the quantity of unconsumed oxygen in the products of combustion from said furnace, the combination of means for mixing a portion of said products of combustion with a combustible gas, a combustion catalyst arranged to burn said mixture of gases, and means responsive to the temperature of said mixture for operating a furnace combustion controlling mechanism.

27. A method of controlling the combustion of fuel in a boiler furnace which comprises, supplying air to the furnace for combustion, regulating a portion of the air supply by mechanism operated in accordance with variations in the boiler steam pressure for controlling the rate of combustion and regulating another portion of the air supply to the furnace by mechanism operated in accordance with the quantity of free or unconsumed oxygen contained in the waste products of combustion for controlling the completeness of combustion.

28. A method of controlling the combustion of fuel in a boiler furnace which comprises supplying air to the furnace for combustion, continuously regulating a portion of the air supply by mechanism operated in accordance with variations in the steam boiler pressure for controlling the rate of combustion and regulating another portion of the air supply by mechanism operated in accordance with a continuous determination of the oxygen content of the waste products of combustion for controlling the completeness of combustion.

29. A method of controlling combustion in a furnace supplied by fuel of varying chemical composition which comprises, introducing air to the furnace for burning the fuel and automatically maintaining a substantially constant condition of over-ventilation in the furnace by mechanism responsive to a chemical analysis of the exhaust flue products.

30. A method of controlling the combustion of fuel in a furnace, supplying fuel of a varying chemical composition to the furnace, introducing air to the furnace for burning the fuel and automatically controlling the supply of air to the furnace by mechanism responsive to the oxygen content of the exhaust flue products to maintain a substantially constant condition of over-ventilation in the furnace.

31. A method of controlling the combustion of fuel in a boiler furnace which comprises supplying fuel of varying chemical composition to the furnace, introducing primary air into the fuel body, introducing secondary air into the furnace above the fuel body, regulating the supply of primary air by mechanism responsive to the boiler steam pressure to control the rate of combustion and regulating the supply of secondary air by mechanism responsive to the oxygen content of the exhaust flue products to control the completeness of combustion.

32. A method of controlling the combustion of fuel in a furnace having combustion products of varying carbon dioxide content issuing therefrom, which comprises introducing air into the furnace for burning the fuel and automatically maintaining a substantially constant condition of over-ventilation in the furnace by a mechanism responsive to a chemical analysis of the exhaust flue products.

33. The method of controlling combustion in a furnace burning fuels containing substantial percentages of elements other than carbon, which comprises introducing air into the furnace for burning the fuel and automatically controlling the flame temperature in the furnace by a mechanism responsive to a chemical analysis of the exhaust flue products.

34. A method of controlling combustion in a boiler furnace which comprises supplying air and fuel to the furnace for combustion, regulating the rate of combustion in the furnace by a mechanism responsive to variations in the boiler steam pressure and regulating the completeness of combustion in the furnace by mechanism responsive to a chemical analysis of the exhaust flue products.

In testimony whereof I affix my signature.

JOHN WILLIAM GRISWOLD.